(12) United States Patent
Young

(10) Patent No.: US 6,911,120 B2
(45) Date of Patent: Jun. 28, 2005

(54) DISTILLATION SYSTEM WITH INDIVIDUAL FRACTIONATION TRAY TEMPERATURE CONTROL

(76) Inventor: Li Young, 553 Stony Brook Dr., Bridgewater, NJ (US) 08807

( * ) Notice: Subject to any disclaimer, the term of this patent is extended or adjusted under 35 U.S.C. 154(b) by 729 days.

(21) Appl. No.: 09/920,131

(22) Filed: Aug. 1, 2001

(65) Prior Publication Data

US 2003/0024801 A1 Feb. 6, 2003

(51) Int. Cl.⁷ .............................................. B01D 3/42
(52) U.S. Cl. ........................... 203/2; 202/160; 202/206
(58) Field of Search ..................... 203/1, 2, DIG. 18; 202/160, 206

(56) References Cited

U.S. PATENT DOCUMENTS

| | | |
|---|---|---|
| 1,744,421 A | 1/1930 | Stroud, Jr. et al. |
| 2,739,221 A | 3/1956 | Morey |
| 2,894,881 A | 7/1959 | Wolsten, Jr. et al. |
| 3,053,521 A * | 9/1962 | Plaster et al. ............ 261/114.1 |
| 3,133,014 A | 5/1964 | Cross, Jr. |
| 3,143,167 A | 8/1964 | Veith |
| 3,239,432 A * | 3/1966 | Rhodes et al. .............. 202/160 |
| 3,502,547 A | 3/1970 | Bridgeford |
| 3,544,428 A | 12/1970 | Meilbom |
| 4,117,881 A | 10/1978 | Williams et al. |
| 4,276,264 A | 6/1981 | Redikultsev et al. |
| 4,346,754 A | 8/1982 | Imig et al. |
| 4,444,576 A * | 4/1984 | Ryan et al. .................... 62/632 |
| 4,526,657 A * | 7/1985 | Hobbs et al. ................... 203/3 |
| 4,544,452 A * | 10/1985 | Halliday et al. ............... 203/1 |
| 4,714,542 A | 12/1987 | Lockett, Jr. |
| 5,314,587 A * | 5/1994 | Smith ............................ 203/1 |
| 5,326,436 A | 7/1994 | Sampath et al. |
| 6,193,849 B1 | 2/2001 | Lockett, Jr. |
| 6,605,190 B1 * | 8/2003 | Salamon et al. ............... 203/1 |

FOREIGN PATENT DOCUMENTS

WO    WO 98/35737    * 8/1998

* cited by examiner

Primary Examiner—N. Bhat
(74) Attorney, Agent, or Firm—Kenneth P. Glynn

(57) ABSTRACT

The present invention is a distillation system with individual fractionator tray temperature control, with the use of either a heating element or a cooling element, and in some preferred embodiments, the use of both a heating element and a cooling element in a plurality of fractionator trays. There is at least, and typically more than one distillation column having a plurality of fractionation trays, and having feed input, liquid removal, and vapor removal with the plurality of trays including at least one of a heating element and a cooling element. Controls are included for separate control of each of the heating element(s) and/or said cooling element(s). These controls may be regulated by a programmable microprocessor, and feedback from temperature sensors may be employed to provide discrete tray-by-tray temperature controls.

18 Claims, 3 Drawing Sheets

DISTILLATION SYSTEM WITH INDIVIDUAL FRACTIONATION TRAY TEMPERATURE CONTROL

BACKGROUND OF THE INVENTION

1. Field of the Invention

The present invention is directed to distillation systems having columns with individual trays having separate and distinct heating and/or cooling capabilities, and in some preferred embodiments, to such systems having tray cooling units which rely upon phase change coolant injection. Preferred embodiments also include preprogrammable and programmable systems.

2. Information Disclosure Statement

The following patents are representative of prior art related to various types of heated/cooled reactors, distillers and the like:

U.S. Pat. No. 1,744,421 to W. F. Stroud, Jr., et al. describes a process which comprises passing vapors upwardly through a plurality of fractionating zones at different levels, passing reflux liquid downwardly in a continuous stream through said zones countercurrent to and in contact with said vapors, withdrawing liquid from one of said zones at a rate in excess of the rate at which reflux liquid is passed there-through, cooling the liquid so withdrawn, and returning liquid so cooled to a zone at least as high as the zone from which it was withdrawn.

U.S. Pat. No. 2,739,221 to Glen H. Morey describes a vessel heater as recited in which includes a first valve communicating with a supply of non-inflammable and non-combustion-supporting fluid in its gaseous phase to regulate admission of a quantity of fluid to blanket said heating element and thereby preclude ignition of combustible products adjacent said heating element, and a second valve communicating with a supply of non-inflammable and non-combustible-supporting fluid in its liquid phase to regulate admission of a quantity of fluid to effect rapid cooling of the vessel heater.

U.S. Pat. No. 2,894,881 to Clinton M. Wolston, Jr. et al. describes a laboratory distillation testing apparatus having a condenser tank, a flask, a flask supporting means, a heating means, a condenser tube passing through the said tank, and a light diffusing panel, the improvements which comprise a recess in said condenser tank, a shield means disposed within said recess, adjustable shelf means carried by said shield means for supporting said flask, conduit means below said tank, and solenoid valve means on said conduit means, the discharge end of said conduit means projecting forwardly of the rear wall of said recess below said condenser tube inlet and arranged to discharge forwardly and downwardly towards said shelf means.

U.S. Pat. No. 3,133,014 to Willis J. Cross, Jr. describes in the fractionation of a synthetic crude effluent obtained from a hydrocarbon conversion reaction, wherein said effluent is fractionated by introducing the same at least partially in vapor state into a fractionating tower for separation into several cuts including (a) a gasoline-containing cut and (b) a bottoms product having a mid-boiling point above 600 F., and wherein a portion of said bottoms product is cooled and admixed in liquid state for direct heat exchange with the hot vapor effluent directed to the fractionating tower; the improvement which comprises introducing said portion of cooled liquid bottoms axially into the vapor conduit carrying the flowing stream of said vapor effluent at a location up-stream of said fractionating tower, said liquid being introduced by discharging a circumferentially expanding cone of said liquid concurrently into said flowing vapor stream, and said location being so selected that the expanding cone of liquid does not contact the inner wall of said conduit along a substantial portion of the path of flow of said liquid toward said tower.

U.S. Pat. No. 3,143,167 to Adolf Vieth describes a temperature controlled enclosure comprising, a first metal wall surrounding the enclosure space, a heating means in thermal contact with said first wall for raising the temperature of the enclosure, a second metal wall surrounding the heating means, cooling means in thermal contact with said second wall for lowering the temperature of the enclosure, a first temperature-sensitive element in thermal contact with said first metal wall, a second temperature-sensitive element in thermal contact with said second metal wall, and a control circuit connected between said elements and said heating and cooling means for energizing the heating and cooling means selectively to produce a desired temperature within the enclosure, said control circuit including a bridge, an amplifier, and a switching means for connecting the heating means to a source of power when said first temperature-sensitive element is connected to the bridge and for activating the cooling means when said second temperature-sensitive element is connected to the bridge.

U.S. Pat. No. 3,239,432 to Joseph C. Rhodes et al. describes an apparatus for controlling the operation of a first distillation column and for determining the distillation properties of a product sample from said first column which apparatus comprises: means for withdrawing a product sample containing a mixture of liquids having different boiling points from said first column; a test column member; a plurality of liquid-retaining trays spaced apart vertically within said test column; a liquid sample container positioned below said test column and in flow communication with the bottom-most portion of said test column; means for receiving said withdrawn product sample and introducing a known amount of said product sample into said container; means for vaporizing liquid sample introduced into said container; vapor riser means for passing vapors from the lower portion of said test column upwardly through said test column to intimately contact liquid retaining on said trays; condensing means communicating with the upper end of said test column to condense all the vapors rising from the upper-most of said trays; means for returning the resulting condensate to the upper-most of said trays; means for maintaining the test column pressure at a substantially constant pressure during a run; means for maintaining a pre-selected level of liquid on said trays; temperature sensing means to sense the temperatures and produce a temperature signal indicative thereof of equilibrium vapors above the trays in said test column; means for receiving said temperature signal and correlating the sensed temperatures with the distillation properties of a known product sample of approximately the same composition as said sample being run and produced an output signal relative to said correlation; and means for receiving said output signal and adjusting the control parameters of the first column in accordance with said output signal.

U.S. Pat. No. 3,502,547 to R. E. Bridgeford describes a separation system for the recovery of a middle boiling fraction from a feed mixture containing said middle boiling fraction and higher and lower boiling fractions, comprising:

(a) a single fractional distillation column containing:

(1) a top section, and (2) a bottom section, said bottom section-having a smaller diameter than said top section;

(b) means for passing said feed mixture into said top section;

(c) a solid vapor impermeable plate separating said top section from said bottom section and having as the only fluid passageway through said plate at least one downcomer;

(d) a tray positioned as the top tray in the top portion of said bottom section and spaced below said plate to form a vapor space therebetween, said tray having weir means for maintaining a liquid level thereon, said at least one downcomer extending downwardly into the liquid retained on said tray so that said at least one downcomer passes only liquid from the bottom portion of said top section to the top portion of said bottom section while vapor is prevented from passing upwardly from said bottom section to said top section;

(e) means for removing from said fractional distillation column and from the system a primary overhead product stream comprising said lower boiling fraction by removing an overhead vaporous fraction from the top portion of said top section;

(f) means for removing from said fractional distillation column and from the system an intermediate vaporous product stream comprising said middle boiling fraction by removing a vaporous fraction from the vapor space above said tray in the top portion of said bottom section;

(g) means for removing from said fractional distillation column and from the system a bottom product stream comprising said higher boiling fraction by removing liquid from the bottom portion of said bottom section;

(h) reboiling means for heating liquid in the bottom portion of said top section to provide stripping vapor for said top section; and (i) reboiling means for heating liquid in the bottom portion of said bottom section to provide stripping vapor for said bottom section.

U.S. Pat. No. 3,544,428 to Marvin E. Mellbom describes a fractionation apparatus comprising a vertically elongated chamber having an upperflashing section, and upper stripping section disposed externally of said elongated chamber and connecting with said upper flashing section and having direct liquid communication with said upper flashing section, a lower flashing section in said chamber below said upper flashing section, a lower stripping section connected to the lower portion of said lower flashing section and having fluid communication therewith, said lower and upper flashing sections in said chambers being separated by a transverse partition adapted to pass vapors from the lower section into said upper section and to prevent liquid flow therebetween, a common fractionating section above said upper flashing section, a conduit means extending upwardly from said partition to said upper flashing section, the upper end of said conduit means being spaced above the elevation of the hereinbelow specified first feed inlet, said conduit means providing vapor communication between said flashing sections, a first feed inlet for introducing a first heated hydrocarbon feed into said upper flashing section, a second feed inlet for introducing a second heated hydrocarbon feed into said lower flashing section, said first feed being independent of and having a different composition than both said second feed and the hereinbelow specified second bottoms fraction, stripping inlet means for introducing stripping material into each of said stripping material into each of said stripping sections, at least one product outlet in the fractionating section of said chamber, a bottoms fraction outlet in said upper stripping section for withdrawing a first bottoms fraction therefrom, and a bottoms fraction outlet in said lower stripping section for withdrawing a second bottoms fraction therefrom.

U.S. Pat. No. 4,117,881 to Williams et al. describes blood cells, blood marrow, and other similar biological tissue is frozen while in a polyethylene bag placed in abutting relationship against opposed walls of a pair of heaters. The bag and tissue are cooled with refrigerationing gas at a time programmed rate at least equal to the maximum cooling rate needed at any time during the freezing process. The temperature of the bag, and hence of the tissue, is compared with a time programmed desired value for the tissue temperature to derive an error indication. The heater is active in response to the error indication so that the temperature of the tissue follows the desired value for the time programmed tissue temperature. The tissue is heated to compensate for excessive cooling of the tissue as a result of the cooling by the refrigerating gas. In response to the error signal, the heater is deactivated while the latent heat of fusion is being removed from the tissue while the tissue is changing phase from liquid to solid.

U.S. Pat. No. 4,276,264 to Redikultsev et al. describes a device for sterilizing water-containing liquid media by steam which comprises a sterilizing vessel with inlet and outlet connections for processed liquid media. A heater is provided in the lower portion of the vessel, while a condenser is arranged in the upper portion thereof. The vessel also houses a coaxially mounted steam-transfer unit representing gas-lift tube with a diffuser disposed over the heater.

U.S. Pat. No. 4,346,754 to Imig et al. describes a heating and cooling apparatus capable of cyclic heating and cooling of a test specimen undergoing fatigue testing. Cryogenic fluid is passed through a block 10 clamped to the specimen 11 to cool the block and the specimen. Heating cartridges 13 penetrate the block 10 to heat the block and the specimen 11 to very hot temperatures. Control apparatus 36 and 46 is provided to alternately activate the cooling and heating modes to effect cyclic heating and cooling between very hot and very cold temperatures. The block 10 is constructed of minimal mass to facilitate the rapid temperature change thereof.

U.S. Pat. No. 4,714,542 to William Lockett, Jr. describes a distillation vapor and feed mixing and subsequent separation process and apparatus involving the introduction of a vaporizing liquid feed into a flashing zone via a tangential nozzle into a mixing and separation chamber which directs the feed into a circumferential path to enhance mixing, and the redirection of rising vapors from the distillation below the flash zone by baffling these vapors into the chamber inlet. The rising vapors are inspirated by the high velocity feed at the inlet side of the chamber and intimate contact and mixing of the rising vapors with the vaporizing feed are enhanced by creating a spinning action. Preferably, the chamber runs peripherally and slightly downward along the inside wall of the distillation column along an arc no greater than 360. Alternatively, the mixing section of the mixing and separation chamber may be located outside of the distillation tower and the feed, passing through a jet ejector would inspirate the rising vapors. Increasing contacting and mixing efficiency in a distillation flash zone increases the yield of more valuable overhead product for the same energy input or permits lower energy input for constant separation between overheads and bottoms in the flash zone.

U.S. Pat. No. 5,326,436 to Sampath et al. describes a method of feeding a fractionator feed mixture having a wide-boiling range vapor-liquid mixture is provided. Also, provided is a fractionator feed section adapted to receive a two phase feed mixture and has operational stability when fed a feed mixture which generates significant volume of vapor in the feed section.

U.S. Pat. No. 6,193,849 to William Lockett, Jr. describes a fractionator having a fractionation vessel, a reactor effluent vapors inlet, a vapor feed contacting zone, a baffled contacting section above the vapor feed contacting zone, a tops section above the baffled contacting section, a heavy bottoms liquid hold-up pool section below the vapor feed contacting zone, a bottoms outlet, a bottoms recycle system with a heat exchanger. Recycled, cooled bottoms is fed back to the fractionation vessel at the heavy bottoms liquid hold-up pool section and above the vapor feed contacting zone. The improvements involve providing a separation tray and downpipe for separating cooler bottoms liquid from hotter product vapors within the fractionation vessel: to avoid condensation and absorption of product vapors by the liquid pool; to have more rapid and uniform quenching of hot liquid entering the pool; and substantially reduce costly onstream maintenance to clean fouled bottoms recycle exchangers.

Notwithstanding the prior art, the present invention is neither taught nor rendered obvious thereby.

SUMMARY OF THE INVENTION

The present invention distillation system with individual fractionator tray temperature control, with the use of either a heating element or a cooling element, and in some preferred embodiments, the use of both a heating element and a cooling element in a plurality of fractionator trays.

In the broadest sense, the present invention system includes at least one distillation column having a plurality of fractionation trays, and having feed input means, liquid removal means, and vapor removal means, wherein at least a majority of the plurality of trays include at least one of a heating element and a cooling element. Control means is also included for separate control of each of the heating element(s) and/or said cooling element(s) for the trays having at least one of a heating element and/or a cooling element.

In some preferred embodiments, the distillation system of the present invention includes a plurality of distillation columns functionally connected to one another. For example, there may be a specified number of distillation columns and each distillation column after a first column has a vapor removal means from a preceding distillation column connected to its feed input means, so as to create an in series system.

In some embodiments, The distillation system the majority of the trays have a heating element and/or a cooling element which is integrally formed within the tray.

In some embodiments, the cooling element may be a refrigeration unit, a coolant heat exchanger, or other type of cooling element, or it may be a phase change coolant element.

The present invention distillation system preferred cooling element is a phase change coolant element which may include at least one open area within a tray, with the cooling element having an inlet port for injection of a coolant into the open area within the tray. (This open area acts as a heat absorbent area). The cooling element will also include an outlet port for removal of phase change coolant in gaseous state from the open area of the tray.

These phase change cooling elements of the present invention preferably also includes injection means for injection of the phase change coolant in liquid form into the inlet port of the cooling element for creation of cooling by phase change from a liquid state to a gaseous state.

In most preferred embodiments, the present invention distillation system further includes control means connected to the cooling elements and the heating elements for programmable automatic control therefore, e.g. for control of injection means to control at least one of on/off flow and rate of flow, and to control at least one of on/off heating and rate of heating. The control means may include a programmable device, with appropriate software.

The present invention distillation system with control means preferably includes software in the system for an injection means physical control device, for cyclical on/off control thereof to establish at least one predetermined temperature sequence involving a plurality of diverse, programmable temperature levels, with means to vary on/off time sequences.

Typically, when a phase change liquid coolant cooling element is included, a remote reservoir of a phase change coolant is connected to the injection means and inlet port wherein the reservoir contains a phase change coolant in a liquid state under pressure. It may include phase change coolant generation means connected thereto.

When a phase change coolant is included it may preferably be an environmentally inert material which absorbs heat upon vaporization and has a boiling point below room temperature at atmospheric pressure. Such a phase change coolant may be selected from the group consisting of inert gases, carbon dioxide and nitrogen.

In some embodiments, the present invention distillation system further includes at least one membrane cartridge located in a column between trays for membrane filtration, and typically utilizes a plurality of these membrane cartridges to enhance material separation in the process.

In some embodiments, a downstream vacuum removal unit is located on a last column vapor removal means to enhance separation of materials. Further, there may be included at least one upstream liquid combination unit having plural liquid source inlet means, selective controls for operating any one or more of the plural liquid source inlet means, and outlet means. These are connected, either directly or indirectly, to a first column in the present invention system. When indirectly connected, there may be an evaporation chamber located between the liquid combination unit and the first column and connected to the liquid combination unit outlet means and to a feed input means of the first column to evaporate the liquids into gaseous phase or partial gaseous phase for input to the columns.

There may be at least one valved recycle line connected between two columns to selectively recycle at least a portion of liquid from a downstream column back to an upstream column.

In order to more closely regulate tray temperatures a plurality of temperature sensing means may be located at various tray levels for sensing temperature of the tray levels, and are connected to said control means for temperature feedback to computer software for readjustment of the heating units and said cooling units to fine tune the achievement of predetermined temperatures.

The heating units of the present invention may be any known heating element, but is preferably a heat exchange system or a heating coil system.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

The present invention distillation system is taken to mean a distillation system which involves at least one distillation column which includes the other features of the invention set forth above and below. The term "distillation" and "fractionation" should be interpreted broadly to mean the process of separating liquid materials of differing boiling points by the vaporation and condensation processes. The invention set forth generically in the summary is illustrated by the description of the appended drawings. Thus, the following descriptions should not be deemed as strict interpretations of the present invention.

Figure 1:
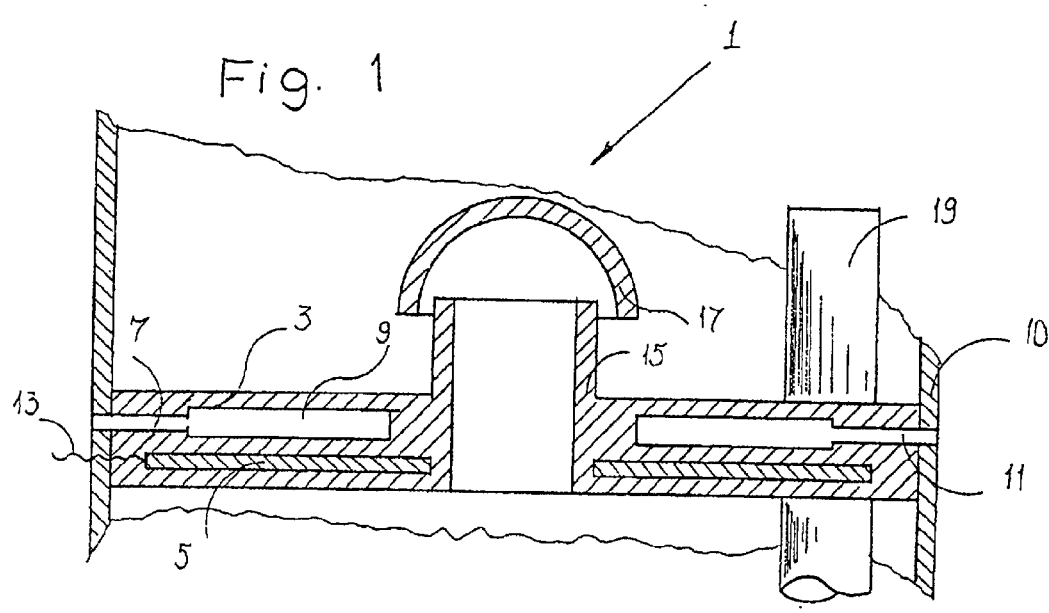
FIGS. 1 and 2 illustrate different types of trays used in the present invention system.

Referring now specifically to FIG. 1, there is shown a portion of a present invention system 1 which includes distillation column 10 and a fractionation tray 3. Tray 3 includes both a controlled heating unit and a controlled cooling unit, critical features of the present invention. As mentioned above, a tray may include either a heating element or a cooling element or both, but in this embodiment, both are illustrated. In addition, a heating unit 5 is included which, in this embodiment, is a heating coil it includes wire connection to a controller, preferably a programmable microprocessor. Further details of operation are set forth in conjunction with the description of FIG. 3 below.

Tray 3 of FIG. 1 includes an inlet port 7 for input of a coolant, open area 9 for absorbing heat and outlet port 11. This cooling unit open area 9 may be an annular space or may have some other configuration, but is designed to have significant surface area between it and tray 3 to enhance heat absorption. The coolant may be a phase change coolant and outlet port 11 will preform as a gaseous state exhaust port. Inlet port 7 and outlet port 11 extend into distillation column 10, as shown. Conventional features such as the vapor uptake 15, bubble cap 17 and downflow pipe 19 are also included.

Figure 2:
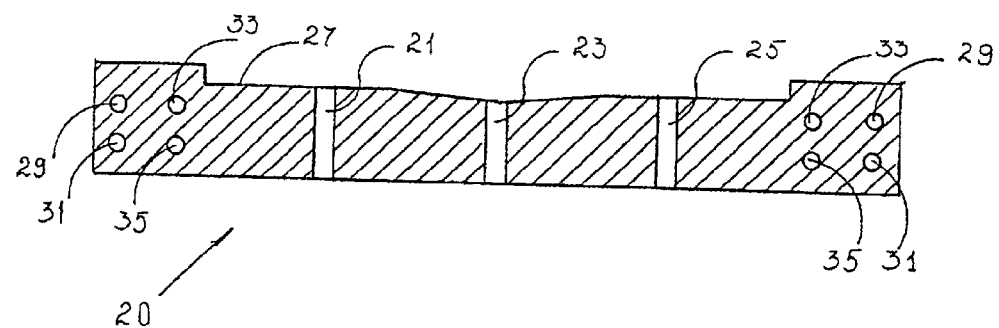

Referring now to FIG. 2, there is shown in alternative present invention tray 20 which includes vertical orifices 21, 23 and 25, throughwhich liquid may flow downwardly and vapors may flow upwardly wherein liquid is contained within the recess 27. Tray 20 includes a set of 4 circular bores which are shown as 29–29', 31–31', 33–33' and 35–35'. Inlet and outlet connections are located on the back side of tray 20 and are not shown. Each of the aforesaid bores may be used as a cooling element or as a heating element. Thus, tray 20 may include only a heating element with all 4 bores being connected to an elevated temperature liquid coolant material, or all 4 bores could act as only a cooling element and be connected to a cooling source. Alternatively, one or more could be connected to a cooling source and one or more could be connected to a heating source so as to create a tray 20 which provides both a heating and cooling in a single tray. Tray 20 could be included on one or more columns and could constitute a plurality of trays located in a column to provide distillation and fractionation temperature controls previously unachievable.

Figure 3:
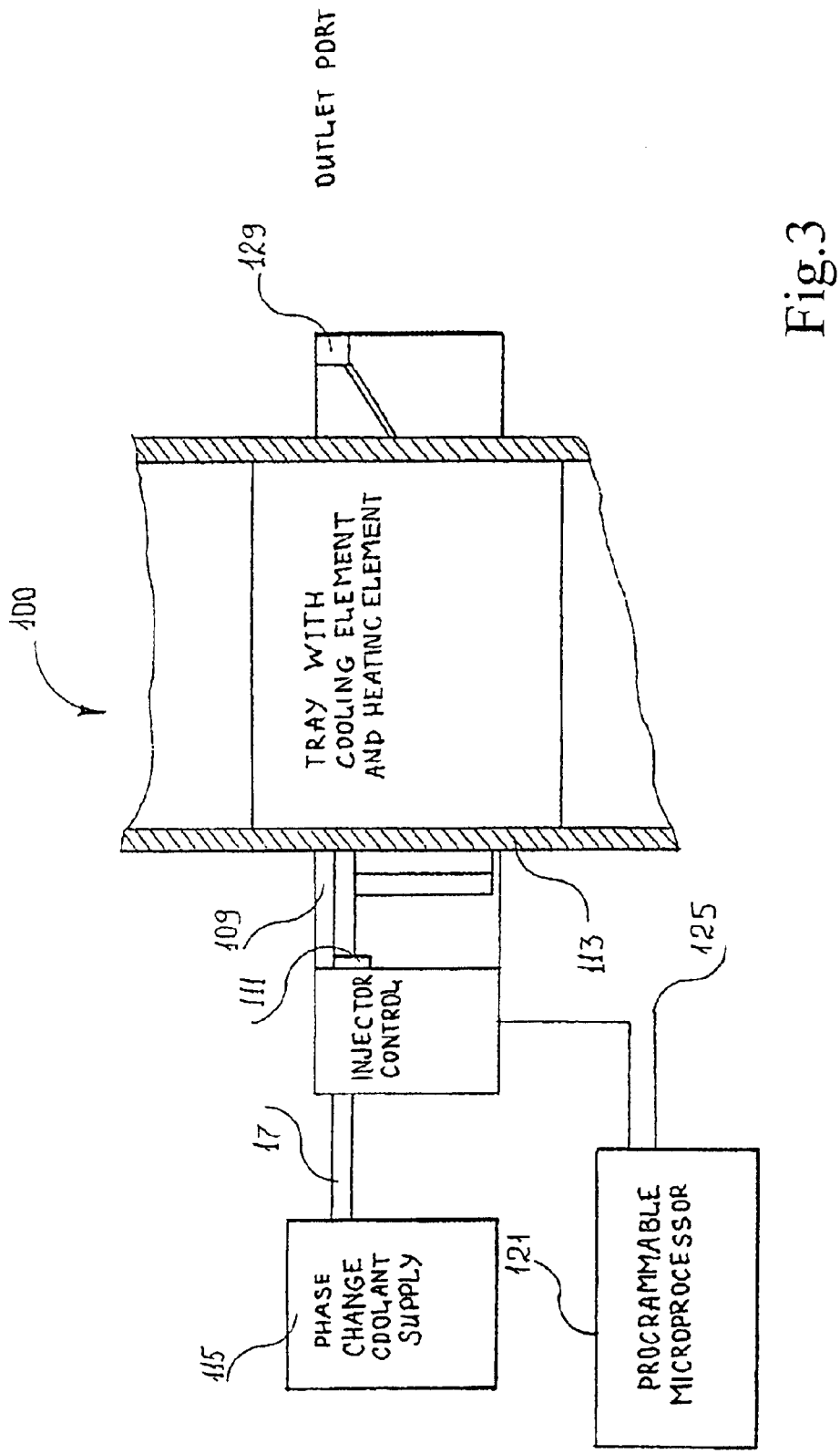
FIG. 3 shows a detailed schematic diagram of a single tray in a present invention system, showing controls; and, FIG. 4 illustrates a detailed embodiment of a present invention system.

FIG. 3 shows a schematic diagram in its simplest form illustrating a present invention system 100. It includes phase change coolant supply 115, feeder line 117, injector control 111 and injector 109. Injector 109 is connected to a tray with a cooling unit inlet port (not shown) contained within tray 130. Tray 130 includes both a cooling element and a heating element. On the outlet side is outlet port 129 for removal of coolant in its gaseous form. Typically, it is injected in liquid form. Programmable microprocessor 121 is connected to both the injector control ill via wiring 123 and the heating element via wiring 125. In an actual system, tray 130 would be duplicated repeatedly in one or more columns and would be connected to the programmable microprocessor so that many tray temperatures could be controlled in real time and/or preprogrammed.

Additionally, preprogrammable microprocessor 121 is connected to temperature sensor 135 for microcontrol and feedback to preprogrammable microprocessor 121 in preferred embodiments.

Figure 4:
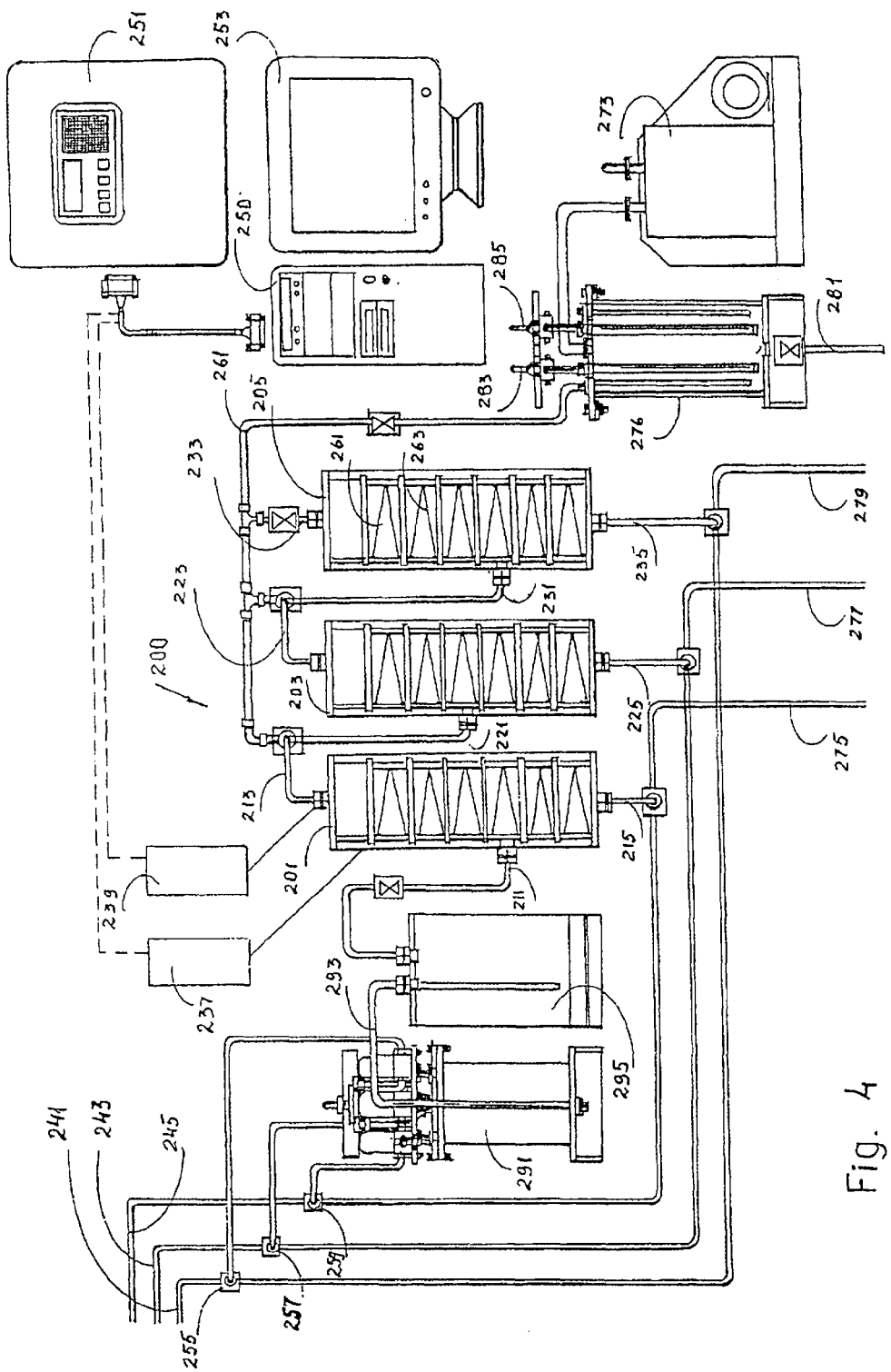

FIG. 4 shows an overall present invention distillation system 200 with 3 distillation columns 201, 203 and 205. Column 201 includes the feed input line, 211 a vapor removal line and a liquid removal line 215. Similarly, columns 203 and 205 have input feed lines 221 and 231, vapor removal lines 223 and 233 and liquid removal lines 225 and 235. In this embodiment, there are also connections and valving to permit recycling from columns 203 and 205 back to upstream column(s), as shown. Column 201, 203 and 205 include a plurality of trays similar to the trays shown in FIGS. 1 and 2 above with the heating and cooling elements contained therein. Coolant supply and heating supply 237 and 239 are connected to the columns 201, 203 and 205 and are merely illustrated as being schematically connected to column 201. Additionally, they are controllably connected to the computer system shown as microprocessor 250, keyboard 251 and monitor 253.

Three input lines 241, 243 and 245 are provided to receive mixtures of liquids for separation and valves to 255, 257 and 259 are provided to control flows to permit shutoff, input to liquid combination unit 291 or bypass of any or all of these lines. For example, mixtures to be separated are fed into liquid combination unit 291, via line 293 are transferred to evaporation chamber 295 and subsequently fed into first column 201 via vapor removal line 211. In this embodiment, separation membrane cartridges such as cartridge 261 and 263 in column 205 are included to further enhance constituent separation. Bottoms may be removed via liquid removal lines 215, 225 and 235, and outlet lines 275, 277 and 279. Evaporative materials are removed via line 261 to cooling chamber 271 connected to vacuum pump 273 with outlet 281 and recycle lines 283 and 285.

The above described systems of the present invention may be constructed of any size and arrangement convenient for a particular purpose. Therefore, the invention could be embodied in the form of very tall, full scale columns towering 50 or 100 feet in height or the invention could be embodied in the form of a bench lab setup. In a preferred embodiment, the present invention may be in the form of a portable system useful for collection of biochemical waste and solvent for recovery and reuse of the solvent.

The present invention systems may include programmable temperature/time sequences utilizing a microprocessor for the heating and cooling unit. With this system, various distillation requirements are automatically achieved, such as heating/cooling, cooling/heating sequences, refluxing and condensing. The preferred embodiments of present invention system cooling unit uniquely relies upon phase change coolants where the endothermal heat of evaporation is absorbed from the tray when the phase change coolant is injected into the heat absorbing area with a programmable device, e.g. a computer, controlled injector. Environmentally insert phase change coolants are utilized and evaporated and dissipated to the atmosphere in gaseous form.

The tray utilized in the present invention may be any form of tray used in distillation/fractionation and is capable of transmitting heat therethrough to add or remove heat during a distillation process. Thus, the tray may be glass, ceramic, cement, metal or other material. It will have connected thereto (inside, outside, both or embedded) at least one temperature sensor, e.g. a thermocouple, to sense temperature. It preferably has at least two temperature sensors, for example, one at an upper portion of the tray and one at the lower portion thereof. The temperature sensors are connected to the control means, which has a programmable device, e.g., a computer, a microprocessor or other known devices as its central component.

The heating unit is one which may be automatically controlled, either by off/on sequencing or amount of heating (rate) or both. The heating unit may be conductive, convective, radiant, directly or indirectly, e.g. by heat exchanger or combination of heating mechanisms but is typically an exchanger heating element or an electric heating element type unit, e.g., with electrical convection, controlled by the microprocessor.

The heating unit and cooling unit may be in close proximity to one another or spaced apart substantially depending upon the actual design, conditions and results desired.

The cooling unit of the present invention, like its heating unit counterpart, may take on any physical shape to accommodate the heat transfer (removal for cooling) relative to the tray. The preferred cooling unit of the present invention system includes a cooling element with an inlet port, a heat absorbing area and an outlet port or a plurality of one or more of these components. It also includes injection means at the inlet port for controlled injection of phase change coolant. While the present invention system may be manufactured and sold in various configurations without a phase change coolant supply, in actual use a phase change coolant supply is essential, e.g. by attachment of one or more pressurized inert liquid tanks or with a generator, or a compressor or other coolant creating, compressing or storing means.

The cooling element may be coiled tubing or a molded, machined or an otherwise-formed open area within the tray to permit injection of phase change coolant. In other words, the open area of the cooling element is enclosed, e.g. with materials of construction which preferably include heat conductive characteristics. The phase change coolant is injected into the heat absorbing area at the inlet port and evaporates under normal pressure to its gaseous state and exhausts as gases through the outlet port. It is the endothermic heat of evaporation to the phase change coolant that absorbs heat from the tray to effect cooling.

The phase change coolant may be any material which evaporates below the desired temperature of the area to be cooled, e.g., below 24° C., and preferably, below 0° C. Such materials are liquid under pressure and may be stored as such in storage reservoirs, e.g. tanks, for subsequent use or otherwise provided as described above. These coolants go through at least one phase change to effect a neat heat absorbing transition, are environmentally inert, i.e. harmless to the environment when dissipated, and include such phase change coolants as are presently and/or will become commercially available. They include, but are not limited to, the elements known as inert gases, carbon dioxide, nitrogen, etc.

The cooling mechanism of the preferred embodiment of the present invention is based on the heat exchange during the phase change coolant material. A precise heat exchange control can be readily achieved by an appropriate selection and adjustment between either liquid to gas or a sequential phase change of liquid to solid then solid to gas. Commonly used in coolants are pressurized liquid carbon dioxide, or pressurized liquid argon, or pressurized liquid nitrogen. Pressurized liquid materials will be selected specifically to accomodate the desired critical point, depending upon the particular materials being separated in the column.

The injection means will typically include an injection nozzle, such as a stainless steel nozzle, a valving mechanism and a supply line, with the valving mechanism directly upstream from the injection nozzle. (In cases where smaller diameter tubing or inlet means is used, then such tubing or inlet means may act as the nozzle itself, without added hardware.) The valving mechanism may be a flap or shutter valve or other on/off valve, or it may be a controlled opening (flow rate controlling valve) such as a stem valve or gate valve. The on/off valve mechanisms may be opened and closed by solenoids or switches or other known devices, and the flow controlling valves may be opened and closed by servo-drivers or other rotating or lifting devices. In a more complicated system, both types of valves, i.e. on/off and flow rate controlling valves may be used to offer both types of controls in the system.

The control means is any programmable device, such as manual switches, dials, buttons, levers, etc., with sensors for feedback, a computer or microprocessor with appropriate software or sequence input, external inputs and wiring to the cooling unit, to the heating unit and preferably, to the tray.

More specifically, the programmable device may have output information available to a user, e.g. a microprocessor may have a display which includes a readout and programming inputs. For example, it could have a plurality of buttons, input means, selection means, switched, keypads, etc., with choices including "COLUMN NUMBER", "TRAY NUMBER", "SEQUENCE NUMBER", "TEMPERATURE", and "TIME" with a numerical keyboard, and the microprocessor itself will divide when to use the heating unit and when to use the cooling unit to achieve the programmed temperatures for the specified times. The "TIME" inputs could be elapsed time needs or actual clock start and end times. In a more preferred embodiment, additional buttons, controls, inputs, icons, selections, etc. could include "HEATING UNIT" and "COOLING UNIT" selections so that both units could operate simultaneously or separately or both, as the user may desire other control inputs/outputs should now be evident to the artisan. Pluralities of these will be provided to accommodate each temperature controlled tray in the system. In yet another embodiment, a user may be offered the opportunity to select proportional controls for flow, tolerances from a predetermined set of choices and other parameters, as a designer may offer to end users. Also, the programmable device may have real time override capabilities, as well as time delay input capabilities before start-up is initiated or even offer unlimited off sequences between heating and/or cooling sequences for inputted periods of time. Other programming possibilities should now be apparent to the artisan without exceeding the scope of the present invention.

Obviously, numerous modifications and variations of the present invention are possible in light of the above teachings. It is therefore understood that within the scope of the appended claims, the invention may be practiced otherwise than as specifically described herein.

What is claimed is:

1. A distillation system with individual fractionator tray temperature control, which compromises:
   (a.) at least one distillation column having a plurality of fractionation trays, and having feed input means, liquid removal means, and vapor removal means, wherein at least a majority of said plurality of trays include a heating element and a cooling element;
   (b.) control means for separate control of each of said heating element and said cooling element for said trays having a heating element and a cooling element;
   wherein said cooling element is at least one open area within said tray, said cooling element having an inlet port for injection of a coolant into said at least one open area within said try, said at least one open area being a heat absorbent area, and said cooling element having an outlet port for removal of said coolant, from said at least one open area.

2. The distillation system of claim 1 wherein there are a plurality of distillation columns functionally connected to one another.

3. The distillation system of claim 2 wherein there are a specified number of distillation columns and each distillation column after a first column has a vapor removal means from a preceding distillation column connected to it's feed input means.

4. The distillation system of claim 3 wherein there is at least one valved recycle line connected between two columns to selectively recycle at least a portion of liquid from a downstream column back to an upstream column.

5. The distillation system of claim 1 wherein said coolant is a liquid phase change coolant and which further includes injection means for injection of said phase change coolant in liquid form into said inlet port of said cooling element for creation of cooling by phase change from a liquid state to a gaseous state.

6. The distillation system of claim 5 which further includes a remote reservoir of a phase change coolant connected to said injection means and inlet port wherein said reservoir contains a phase change coolant in a liquid state under pressure.

7. The distillation system of claim 6 which further includes phase change coolant generation means connected thereto.

8. The distillation system of claim 6 wherein a phase change coolant is included and is an environmentally inert material which absorbs heat upon vaporization and has a boiling point below room temperature at atmospheric pressure.

9. The distillation of claim 8 wherein said phase change coolant is selected from the group consisting of inert gases, carbon dioxide and nitrogen.

10. The distillation system of claim 1 which further includes control means connected to said at least one cooling element and said at least one heating element for programmable automatic control of said injection means to control at least one of on/off flow and rate of flow, and to control at least one of on/off heating rate of heating, said control means including a programmable device.

11. The distillation system of claim 10 wherein said control means includes software, and said system includes an injection means physical control device, for cyclical on/off control thereof to establish at least one predetermined temperature sequence involving a plurality of diverse, programmable temperature levels, with means to vary on/off time sequence.

12. The distillation system of claim 10 wherein there are a plurality of temperature sensing means located in at least one column for sensing temperature of a plurality of tray levels and are connected to said programmable device for adjusting said heating units and said cooling units to obtain predetermined temperatures.

13. The distillation system of claim 1 wherein said cooling element is a heat exchanger.

14. The distillation system of claim 1 which further includes at least one membrane cartridge located in a column between trays for membrane filtration.

15. The distillation system of claim 1, which further includes at least one downstream vacuum removal unit located on a last column vapor removal means.

16. The distillation system of claim 1 which further includes at least one upstream liquid combination unit having plural liquid source inlet means, selective controls for opening and operating any one or more of said plural liquid source inlet means, and outlet means connected, at least indirectly, to a first column.

17. The distillation system of claim 16 which further includes an evaporation chamber located between said liquid combination unit and said first column and connected to liquid combination unit outlet means and to a feed input means of said first column.

18. The distillation system of claim 1 wherein there are a plurality of temperature sensing means located in at least one column for sensing temperature of plurality of tray levels and are connected to said control means.

* * * * *